Figure 1:
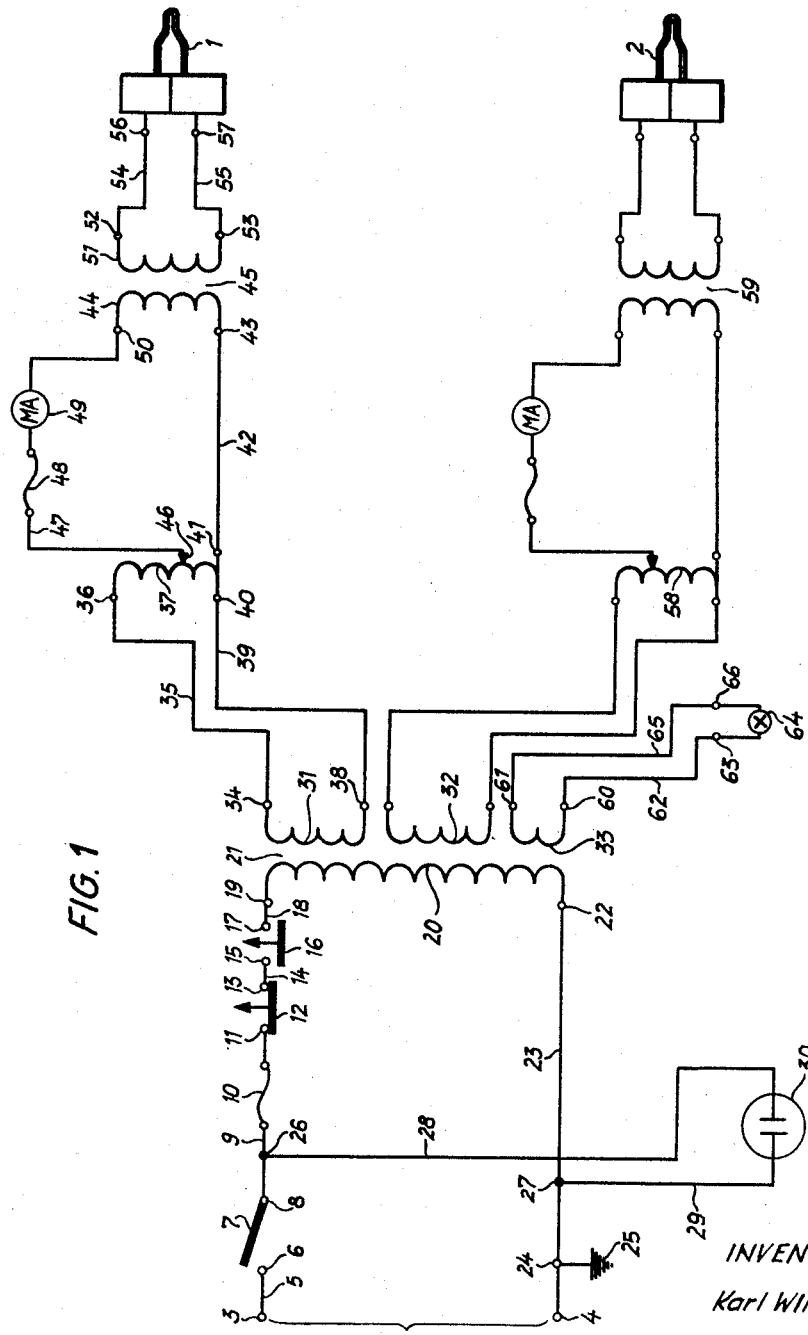

INVENTOR
Karl WINZ
BY
ATTORNEY

March 15, 1960 K. WINZ 2,928,926
CONTROL SYSTEM FOR SEAM WELDING OF THERMOPLASTIC MATERIALS
Filed Dec. 16, 1957 2 Sheets-Sheet 2

INVENTOR
Karl WINZ
BY
Karl Nau
ATTORNEY

United States Patent Office 2,928,926
Patented Mar. 15, 1960

2,928,926

CONTROL SYSTEM FOR SEAM WELDING OF THERMOPLASTIC MATERIALS

Karl Winz, Kaiserslautern-Pfalz, Germany, assignor to G. M. Pfaff A.G., Kaiserslautern-Pfalz, Germany, a corporation of Germany Application December 16, 1957, Serial No. 702,951

Claims priority, application Germany December 15, 1956

6 Claims. (Cl. 219—20)

The present invention relates to a control system for devices or apparatus for the seam welding or sealing of thermoplastic materials, preferably, though not limitatively, of the type described in U.S. patent application Serial No. 530,156, filed August 23, 1955, by Emerich Schenkengel, entitled Device for Seam Welding Thermoplastic Synthetic Materials and assigned to the same assignee as the present application, which prior application is hereby incorporated in the present description by reference.

In the operation of devices of the above and similar type, the thermoplastic members to be welded, such as sheets, strips etc., are superposed and passed through the welding machine, similar to the sewing material of a sewing machine, by means of a pair of pressure feed and welding rollers, with the areas of the members to be welded being raised to elevated or welding temperature by the provision of suitable electrical heating elements or devices. For this purpose, the feed rollers may be heated directly to the proper temperature or fitted with a peripheral electrical heating band or wire of high resistivity material, or separate electrical heating devices may be provided resiliently engaging the superposed members and preceding or being mounted ahead of the pressure feed rollers, in a manner shown and described in the above-mentioned co-pending application.

An important object of the present invention is the provision of simple and efficient heating control means for seam welding machine for the welding or sealing of thermoplastic members, to enable an accurate control and maintenance of the proper welding temperature, to suit existing conditions and welding requirements and to prevent the occurrence of excess temperatures liable to cause damage to or burning of the welding material and other defects.

Another object of the invention is the provision of an electric welding temperature control circuit for thermoplastic seam welding machines which will enable a welding temperature control with a minimum of electrical losses or expenditure of electrical energy in the control element or elements.

Yet another object of the invention is the provision of an electric heat control system for seam welding machines of thermoplastic materials by which the welding temperature can be controlled within close limits efficiently and accurately, to adapt the machine to materials of different characteristics and to comply with other welding conditions and requirements.

Figure 2:
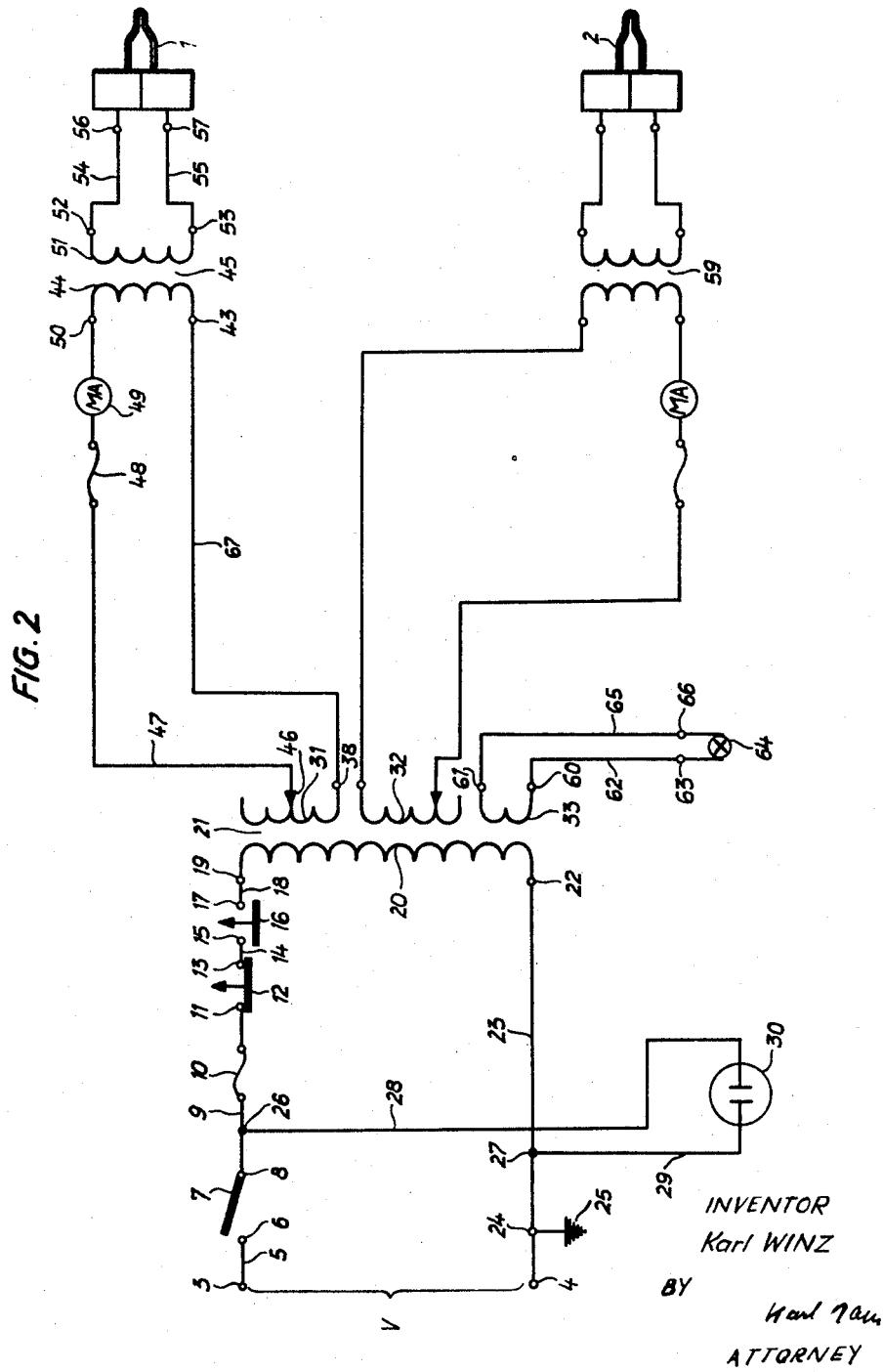

The invention, as to its further objects, as well as novel aspects, will be better understood from the following detailed description taken in reference to the accompanying drawings, forming part of this specification and wherein:

Fig. 1 is a wiring diagram of an electric welding temperature control system for thermoplastic seam welding machines, embodying the principles of the present invention; and Fig. 2 is a similar wiring diagram showing a modification of Fig. 1. Like reference characters denote like parts and elements in both views of the drawings.

With the foregoing objects in view, the invention involves generally the provision of a main or input supply transformer having a primary winding energized by a suitable alternating current power source, such as an electrical network or power line, and whose secondary circuit, serving as the heating control circuit, includes a voltage regulating or control device, such as an inductive or resistive potentiometer or voltage divider, step-transformer, autotransformer etc. The control device, in turn, serves to apply a variable voltage to the primary or high-tension winding of a step-down welding transformer having its secondary winding directly and permanently connected to the heating element of the welding machine. As a result, the control of the heating voltage involves a minimum of heat or electrical current losses, whereby the efficiency of the regulation is limited solely to the relatively low losses in the transformers and control devices, that is, being independent of the relatively high welding current passing through the heating device or devices. With the relatively small powers and units required for the welding of thermoplastic sheets, foil and the like, the resulting losses in the transformers and control devices will be of a low and practically negligible value or order compared with the losses incurred by the conventional welding temperature control methods briefly referred to in the following.

It has already become known, in order to control the voltage applied to the heating element or elements of a thermoplastic seam welding machine, to insert a variable electrical resistor in series with the heating element or elements connected in separate and independent circuits. By varying of the resistance inserted in the circuits, the temperature of the heating element may be controlled to suit any existing welding conditions and requirements. However, since the voltage required for the heating element is of a relatively low order, by far the major portion of the impressed voltage supplied by the welding transformer has to be dissipated in the control resistor. Since, furthermore, a relatively high current intensity is required to produce the necessary welding temperature in the heater, the electrical losses in control devices of this type have been substantial, whereby to result in a substantial reduction of the all-over efficiency of the regulating circuit, on the one hand, and to require special cooling means to remove the heat generated in the control devices. This made it furthermore impossible in many cases to mount the control resistors in a common casing together with the cooperating parts upon the frame or support of the machine or at a place convenient to and readily accessible to the operator.

According to a preferred embodiment of the present invention, the control circuit proper being separate and electrically isolated from the heating circuit comprises a relatively course or step-by-step operated control device, such as a step-transformer, auto-transformer etc., connected in parallel to the secondary winding of the input transformer in the manner of a voltage divider or potentiometer the output voltage of which is applied to the high tension input winding of the step-down welding transformer by way of a fuse and suitable monitoring or indicating device.

Alternatively, the control circuit may comprise the secondary winding of the input transformer adapted for step-by-step output voltage control and being directly connected to the high tension winding of the welding transformer through said fuse and monitoring device.

The design of the control device in the form of a course or separate step-by-step voltage regulator or in the form of an adjustable secondary winding of the input transformer, as pointed out above, makes it possible to effect a control of the welding temperature by means of a minimum of apparatus and at low cost, inasmuch as the discontinuous voltage changes or steps produced in the regulator or input transformer secondary will be largely equalized or smoothened by the step-down effect of the welding transformer connected to the voltage control device. For this purpose, according to a special feature of the invention, the transmission ratio of the welding transformer is made relatively large compared with the transformation ratio of the input transformer, such as, about ten times the former, according to a practical example.

The control or monitoring device, connected between the voltage regulating device or the variable input transformer secondary and the input winding of the welding transformer, may be in the form of a current indicator or ammeter which is preferably directly calibrated in degrees of welding temperature. This makes it possible for the operator to directly control and maintain a required welding temperature by means of the control device according to the invention.

Referring to the drawings, Fig. 1, the reference numerals 1 and 2 indicate a pair of heating elements of a thermoplastic welding machine, such as a pair of separate heaters preceding the pressure feed and welding rollers, as shown in the above-captioned patent application. Thus, item 1 may be the heating element preceding the upper feed roller and item 2 may be the element preceding the lower feed roller, both heating elements resiliently engaging the upper and lower faces of a pair of superposed thermoplastic members passed between said rollers for seam welding. The operating voltage for energizing the heating devices 1 and 2, which may be a line or network voltage V supplied by terminal posts 3 and 4, is shown in the drawing to be supplied from one phase 3 of a three-pase power network, with the terminal 4 corresponding to the neutral conductor of the network. The latter may also serve to energize a three-phase driving motor (not shown) to operate the pressure feed rollers of the welding apparatus.

Connected to network terminal 3 through lead 5 is one terminal 6 of a main switch 7 whose second terminal 8 is connected through a lead 9 and fuse 10 to the terminal 11 of an auxiliary switch 12, the function of which will be described presently. The remaining terminal 13 of the switch 12 is, in turn, connected through a lead 14 to the terminal 15 of a further switch 16 controlled by the starting device of the pressure feed rollers, as described hereinafter, the second terminal 17 of switch 16 being connected to terminal 19 of the primary winding 20 of an input transformer 21 whose opposite terminal 22 is returned through a lead or line 23 to the network terminal 4 or neutral point of the system which is advantageously connected to ground 25 connected to junction point 24 on line 23. Further connected between a junction point 26 on line 9 and a junction point 27 on line 23 through leads 28 and 29 is a control or indicating lamp 30 of any suitable type, such as a neon or gas discharge device etc.

The secondary of the input transformer 21 comprises three windings 31, 32 and 33. The terminal 34 of the secondary winding 31 is connected through lead 35 to terminal 36 of the voltage regulator or control device 37 whose opposite terminal 40 is returned to the remaining terminal 38 of winding 31 through a lead or connecting line 39. The output terminal 41 of the control device or voltage devices 37, being identical with the input terminal 40, is connected through a lead 42 to one of the input terminals 43 of the high tension input winding 44 of a step-down welding transformer 45, the opposite terminal 50 of winding 44 being returned to a variable tap connection or slidable contact 46 of the voltage control device 37 through a lead or line including a fuse 48 and a monitoring device, such as an ammeter 49.

The terminals 52 and 53 of the low voltage or secondary winding 51 of the welding transformer 45 are connected, through a pair of leads 54 and 55, to the terminals 56 and 57 of the heating element 1 of the welding machine. In other words, the heating circuit is directly and permanently connected to the secondary of the welding transformer and accordingly is separate and electrically disconnected from the welding control circuit proper connected between the secondary 31 of the input transformer 21 and the primary 44 of the welding transformer 45 and including the voltage control device 37. The latter may preferably be in the form of a toroidal potentiometer or auto-transformer serving to adjust the heating voltage applied to the heater 1, to control and maintain a desired welding temperature of the members to be joined or sealed.

In a similar manner, the secondary winding 32 of the input transformer 21 is connected to the heating element 2 by way of a voltage control device 58 having and adjustable contact 68 and a welding step-down transformer 59. Otherwise both circuits for the heating elements 1 and 2 are substantially identical, so that further description may be dispensed with.

There is further provided an auxiliary pilot or indicator lamp 64 having terminals 63 and 66 connected to the terminals 60 and 61 of a third secondary winding 33 of the input transformer 21 through a pair of leads 62 and 65.

In the following the operation and control of the temperature of the heater 1 will be described in detail, is being understood that the same operation and control applies in identical manner to the heater 2.

In order to start the welding machine, the three-pole switch of the driving motor (not shown) is closed simultaneously with the closing of switch 7. This operating condition is indicated by the lamp 30 energized through a circuit traced as follows: network terminal 3, lead 5, terminal 6, switch 7, terminal 8, junction 26, lead 28, lamp 30, lead 29, junction 27, line 23 and network terminal 4.

Connected in known manner between the feed pressure rollers and the driving motor is a coupling device which may be operated by a foot treadle or equivalent control member. In order to prevent premature heating of the heating elements 1 and 2, liable to result in damage to or burning of the welding material, there is provided the switch 16 which is in open position in the normal or inoperative condition of the device. Upon operation of the foot treadle or the like to effect driving connection between the motor and feed rollers, the switch 16 is closed immediately prior to the starting of the feed rollers, whereby to apply the input voltage V to the prmary 20 of the input transformer 21 through a circuit traced as follows: network terminal 3, lead 5, terminal 6, switch 7, terminal 8, lead 9, fuse 10, terminal 11, switch 12, terminal 13, lead 14, terminal 15, switch 16, terminal 17, lead 18, terminal 19, primary winding 20, terminal 22, lead 23 and network terminal 4.

Depending upon the transformation ratio of the input transformer 21, secondary voltages are induced in the windings 31, 32 and 33. This operating condition is indicated by the lamp 64 by the energization of the circuit traced as follows: secondary winding 33, terminal 61, lead 65, terminal 66, lamp 64, terminal 63, lead 62 and terminal 60.

The voltage induced in the secondary 31 is applied through leads 35 and 39 to the voltage control device 37 and a suitable fractional output voltage, depending upon the position of the slidable contact 46, is impressed upon the input winding of the welding transformer 45. Depending upon the transformation ratio of the transformer 45, a low voltage induced in the secondary 51 is applied to the heating element 1 through leads 54 and 55.

The heating element may consist of a strip or band of resistive material directly mounted upon the circumference of the feed roller or it may be in the form of a loop or wire such as shown by German Patent 950,425, or of any other construction known in the art. In using conventional high resistivity materials, such as, for instance, materials known as Constantan, Nichrome, etc., only a brief heating period is required upon closing of the electric circuit to raise the heaters to the desired welding temperature, whereby the device is in immediate operating condition upon closing of switch 7.

By adjustment of the slidable contact 46, the voltage impressed upon the high tension winding 44 of the welding transformer 45 may be varied between zero and a maximum determined by the voltage induced in the secondary winding 31. As a result of the step-down action of the voltage by the transformer 45, the control device may be in the form of a course or step-by-step regulator, such as a resistance potentiometer or auto-transformer, due to the fact that the discontinuous voltage changes or steps will be substantially equalized or smoothened in the secondary circuit of winding 51. As a result, the regulator 37 may be of a simple and low-cost design or construction, without impairing the accuracy of the welding temperature control.

If the device is to be disconnected, switch 7 and the motor control switch are opened, resulting in an extinction of the indicator lamps 30 and 64.

In certain cases it is necessary, during the operation of the feed rollers and advance of the welding material, to interrupt the heating of the elements 1 and 2, in order to readjust the position of the welding material or for any other reason. For this purpose, there is provided the switch 12 already described which may be in the form of a knee-controlled switch or in any other form suitably mounted upon the frame or support of the machine. If the operator desires to interrupt the heating, without arresting the advance of the welding material by the feed rollers, he operates the switch 12 to open position, to interrupt the primary circuit of the input transformer 21, thus causing extinction of the indicator lamp 64 and interrupting the energization of the heating elements 1 and 2, in a manner readily understood. After the necessary adjustments have been made, the circuit of the input winding of transformer 21 is reclosed by the release of the knee-control lever or the like, to reclose switch 12 and to apply heating current to the devices 1 and 2.

During temporary stoppage of the machine, such as to enable the insertion of new welding material, provision should be made to disconnect the heaters prior to the stopping or decoupling of the feed rollers, in order to prevent burning of the welding material while in a stationary condition. For this purpose, the switch 12 is so arranged and controlled as to be opened while the feed rollers are still in operation. As a result, the circuit of the input winding of the transformer is interrupted, thus preventing the above-mentioned defects. After the feed rollers have been stopped upon decoupling by the foot treadle or the like, switch 12 may again be closed, since the switch 16 has been opened in the meantime by the coupling device.

The monitoring device connected between the control device 37 and the high tension winding 44 of the welding transformer 45 consists preferably of a current indicator or ammeter whose indicating scale is advantageously calibrated directly in degrees of temperature of the heating element. In this manner, the operator is enabled to adjust and maintain a desired welding temperature, to suit any variations in the characteristics of the welding materials and to comply with any other conditions and requirements.

In the embodiment of the invention according to Fig. 2, the function and operation of the control is substantially the same as in the case of Fig. 1, so that a detailed description will be superfluous, as far as the common operation is concerned, as will be understood.

More specifically, upon operation of the coupling member (foot treadle etc.), the switch 16 will be closed, whereby to apply input operating voltage to the device. This, in turn, results in the generation of secondary voltages in the windings 31, 32 and 33, as indicated by the lamp or indicator 64, in substantially the same manner as in the case of Fig. 1.

In the following, only the control of the heater 1 will be described, the control of the heater 2 being identical, as will be understood.

In Fig. 2, the terminal 38 of the secondary winding 31 of the input transformer 21 is connected through lead 67 directly to the terminal 43 of the input winding 44 of the welding transformer 45, the opposite terminal 50 of winding 44 being returned through lead 47 to a slidable contact 46 upon winding 31 by way of the fuse 48 and monitoring device 49. In other words, the transformer winding 31 is constructed in the form of a step transformer, to provide a variable output voltage, to dispense with a separate voltage control device.

By varying the position of the sliding contact 46 or 68, the voltage applied to the primary of the welding transformers 45 and 59 may be controlled, whereby, in turn, to control the temperature of the heating elements 1 and 2. During temporary stoppage of the feed rollers, it is necessary again to first open the switch 16, to interrupt the primary circuit of the input transformer 21. The remaining operations are substantially similar to those described in reference to Fig. 1.

Again, the step-down ratio of the input transformer 21 may be a small fraction of the voltage step-down ratio of the welding transformer 45, whereby to allow of a relatively course or step-by-step control of the voltage impressed upon the welding transformer by way of the adjustable contacts 46 and 68, respectively.

The control device according to the invention may be constructed as a single unit and mounted at a convenient and readily accessible location upon the support or frame of the welding machine. Since practically no heat is generated in the control device, special cooling means are dispensed with, resulting in additional advantages of both practical and technical nature, as will be obvious.

In the foregoing the invention has been described with reference to a specific illustrative device. It will be evident, however, that variations and modifications, as well as the substitution of equivalent parts and elements for those shown herein for illustration, may be made without departing from the broader scope and spirit of the invention as set forth in the appended claims. The specification and drawings are accordingly to be regarded in an illustrative rather than in a restrictive sense.

I claim:

1. The combination with a device for the seam welding of sheet-like thermoplastic members of the type comprising means for passing a pair of superposed members to be welded between feed pressure welding rollers and a pair of electrical heating devices contacting each of the superposed members to raise the areas to be joined to welding temperature, of a control system comprising a first step-down transformer connectible to an alternating current power source and having a pair of secondary windings, a pair of further step-down transformers each having a primary winding energized by one of said secondary windings and having secondaries directly feeding said heating devices, respectively, and individual relatively course voltage control means, to vary the voltage impressed from said first secondary windings upon said further transformers, the step-down voltage ratios of said further transformers being a substantial multiple of the step-down ratio of said first transformer.

2. A control system as claimed in claim 1, including indicating means of the primary currents of said further transformers directly calibrated in degrees of temperature of the associated heating devices.

3. A control system as claimed in claim 1 wherein said last means is comprised of a pair of autotransformers connected each between one of said first secondary windings and the associated further transformers, respectively.

4. In combination with a plurality of low voltage electric heating devices, a control system comprising an alternating current source of relatively high voltage compared with the heating voltage of said devices, a primary step-down transformer having an input winding connected to said source and a plurality of output windings, a plurality of secondary step-down transformers having input windings connected each to one of the output windings of said primary transformer and having output windings each feeding one of said devices, multiple control means to effect a relatively course control of each of the voltages impressed from the output windings of said primary transformer upon the associated secondary transformers, the voltage step-down ratio of said secondary transformers being a substantial multiple of the voltage step-down ratios between the input and output windings of said primary transformer, whereby to enable a relatively close and independent heating temperature control of said devices by said multiple control means.

5. In a control system as claimed in claim 4, said control means being comprised of a plurality of step transformers each interposed between an output winding of said primary transformer and the input winding of the associated secondary transformer, and the step-down ratio of said secondary transformers being about ten times the step-down ratio between the input and output windings of said primary transformer.

6. In a control system as claimed in claim 4, said control means consisting of adjustable contact means for the output windings of said primary transformer for effecting a step-by-step control of the voltage impressed upon said secondary transformers, and the voltage step-down ratio of said secondary transformers being about ten times the step-down ratio between the input and output windings of said primary transformer.

References Cited in the file of this patent

UNITED STATES PATENTS

| | | |
|---|---|---|
| 2,422,482 | Guyer | June 17, 1947 |
| 2,443,077 | Martin | June 8, 1948 |
| 2,510,770 | Bohn | June 6, 1950 |
| 2,623,176 | Witsenburg et al. | Dec. 23, 1952 |
| 2,633,443 | Langer | Mar. 31, 1953 |
| 2,635,487 | Potter et al. | Apr. 21, 1953 |
| 2,641,716 | Hyer et al. | June 9, 1953 |
| 2,677,039 | Clark | Apr. 27, 1954 |
| 2,822,575 | Imbert et al. | Feb. 11, 1958 |